Aug. 9, 1949.

J. L. DRAKE 2,478,812

APPARATUS FOR MANUFACTURING HOLLOW
GLASS BUILDING BLOCKS

Filed April 15, 1942

Inventor
JOHN L. DRAKE.

By 
Attorney

Inventor
JOHN L. DRAKE.
By Frank Fraser
Attorney

Aug. 9, 1949.   J. L. DRAKE   2,478,812
APPARATUS FOR MANUFACTURING HOLLOW
GLASS BUILDING BLOCKS
Filed April 15, 1942   5 Sheets-Sheet 4

Inventor
JOHN L. DRAKE
By Frank Fraser
Attorney

Patented Aug. 9, 1949

2,478,812

UNITED STATES PATENT OFFICE 2,478,812

APPARATUS FOR MANUFACTURING HOLLOW GLASS BUILDING BLOCKS

John L. Drake, Toledo, Ohio, assignor to Libbey-Owens-Ford Glass Company, Toledo, Ohio, a corporation of Ohio Application April 15, 1942, Serial No. 439,020

4 Claims. (Cl. 49—1)

1

The present invention relates to apparatus for manufacturing hollow glass building blocks, and constitutes a continuation in part of application Serial No. 243,407, filed December 1, 1938, which has since become abandoned.

An object of the invention is the provision of an improved apparatus for producing multi-part hollow glass building blocks composed of two substantially similar preformed sections joined together at the edge portions thereof.

Another object of the invention is the provision of an improved apparatus for joining the preformed sections of the block in a manner to permanently unite them with one another and at the same time effectively remove the air from between said sections to produce a vacuum within the completed block.

Another object of the invention is the provision of a novel apparatus wherein the preformed sections of the block are assembled and united with one another in a controlled vacuum, whereby to obtain more uniform results in the making of the blocks as well as the production of blocks having a maximum degree of insulating capacity.

Other objects and advantages of the invention will become more apparent during the course of the following description, when taken in connection with the accompanying drawings.

In the drawings wherein like numerals are employed to designate like parts throughout the same.

Figure 6:
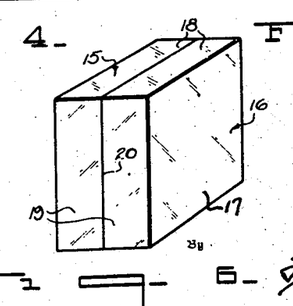
Fig. 6 is a perspective view of the finished block.

With reference first to Fig. 6, there is disclosed

2 a hollow glass building block of rectangular form composed of two substantially similar preformed cup-like sections of halves 15 and 16. Each section includes a bottom wall 17 and side and end walls 18 and 19 respectively; the two sections being permanently united with one another along their edge portions as indicated at 20.

In Figs. 1 to 5 inclusive is illustrated one method and apparatus for producing the block shown in Fig. 6. The apparatus embodies two similar machines 21 and 22 arranged side by side and each being adapted to produce one of the sections or halves of the glass block. For instance, machine 21 can produce the section 15 of the block and machine 22 the section 16. The machines 21 and 22 are adapted to be supplied with molten glass from the furnaces 23 and 24 respectively.

Figure 1:
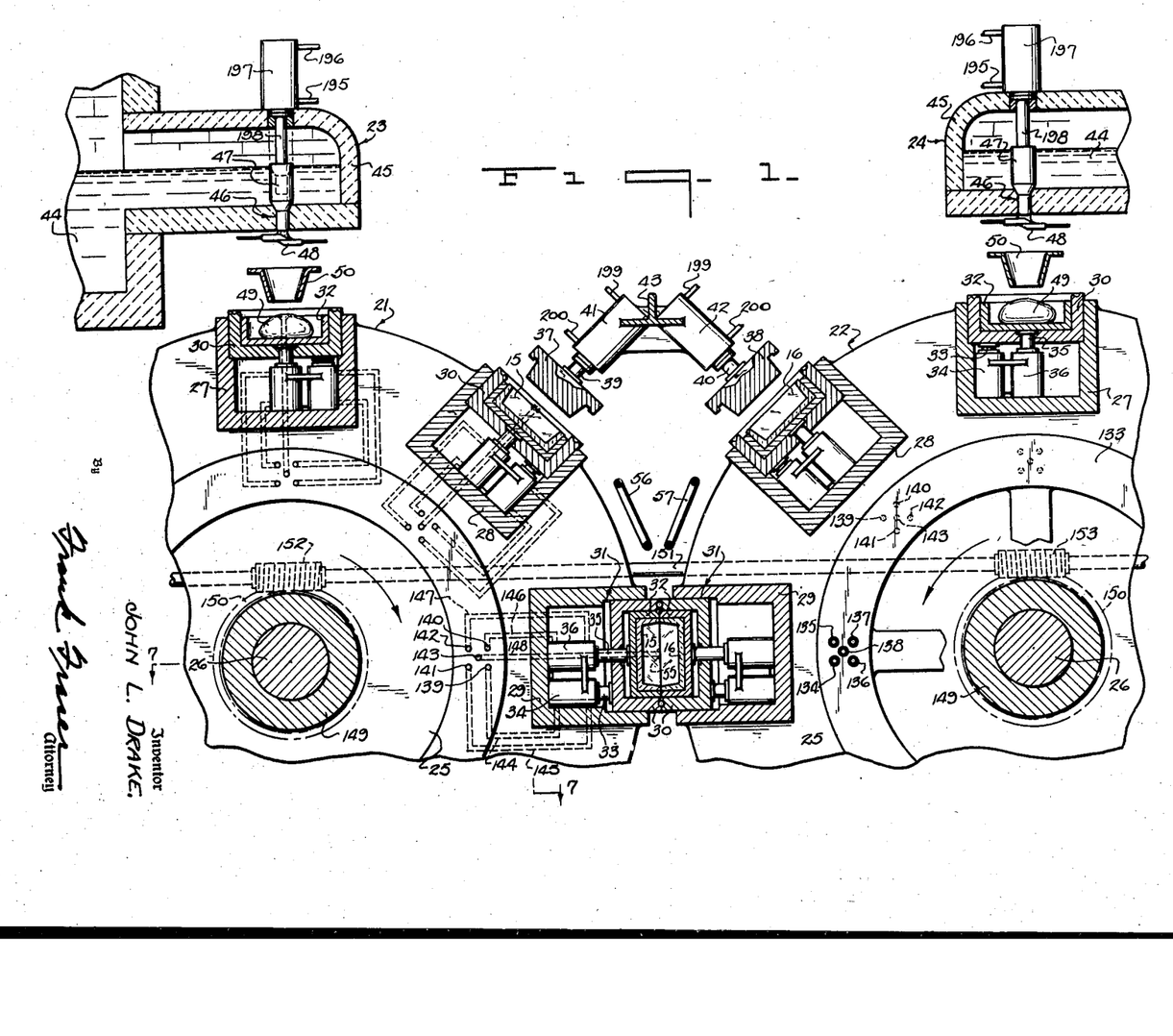
Fig. 1 is a vertical longitudinal section through one form of apparatus provided for carrying out the invention.

Each machine comprises a rotatable carriage 25 mounted upon a horizontal shaft 26 and provided with a plurality of rectangular mold carriers 27, 28, 29, etc., the number of which may be varied as desired. Arranged within each of the mold carriers 27, 28, 29, etc., is a cup-shaped mold composed of an outer section 30 and an inner section 32. The outer section 30 is slidable within guideways 31 formed in the respective carrier, while the inner mold section 32 is slidably received within said outer section. The outer mold section 30 is carried by a piston 33 operable within a cylinder 34, while the inner mold section 32 is carried by a piston 35 operable within a cylinder 36. Both of the cylinders 34 and 36 are arranged within the respective mold carrier.

Associated with the machines 21 and 22 are plungers 37 and 38 respectively which cooperate with the inner mold sections 32 of said machines to form the two sections 15 and 16 of the glass blocks as will be more clearly hereinafter apparent. The plungers 37 and 38 are carried by pistons 39 and 40 respectively operable within cylinders 41 and 42 mounted upon the fixed supporting means 43.

Each of the furnaces 23 and 24 contains a mass of molten glass 44 which is continuously supplied to the container 45. The bottom of the container is provided with an outlet 46 controlled by a vertically movable plunger 47. Shears 48 operate periodically to sever the formed charges 49 and permit them to drop through funnel guides 50 into the molds. After a measured quantity of molten glass 49 has been deposited within the molds disposed beneath the funnel guides 50, the carriages 25 are rotated in opposite directions, as indicated by the arrows, to bring the molds into position opposite the plungers 37 and 38. The plungers are then operated to press or shape the charges of molten glass within the molds to form the two cup-like sections or halves 15 and 16 of the glass block shown in Fig. 6. The shape and size of the block sections is controlled by the shape and size of the plungers 37 and 38 and inner mold sections 32. The carriages 25 are then rotated to bring the molds and preformed sections of the block into horizontal position opposite one another and while in this position, the carriages are stopped and the two sections of the block are adapted to be brought together and permanently united with one another.

Figure 2:
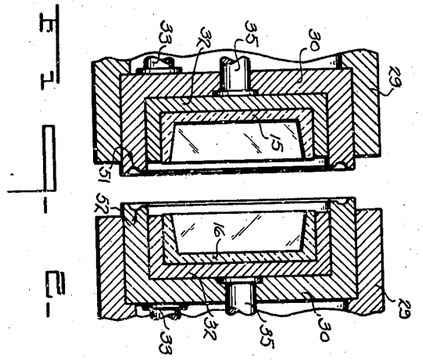
Figs. 2, 3, 4 and 5 are sectional views showing the successive positions assumed by the apparatus during the assembling and uniting of the preformed sections of the block.

When the molds and preformed sections of the block are first moved to horizontal position, they will assume the relative positions indicated in Fig. 2. In other words, the outer mold sections 30 of the two machines 21 and 22 will be spaced from one another. After reaching this position, the pistons 33 are actuated to move the outer and inner mold sections 30 and 32 forwardly as a unit until the opposed outer mold sections engage one another at the edges thereof, as shown in Fig. 3.

Figure 3:
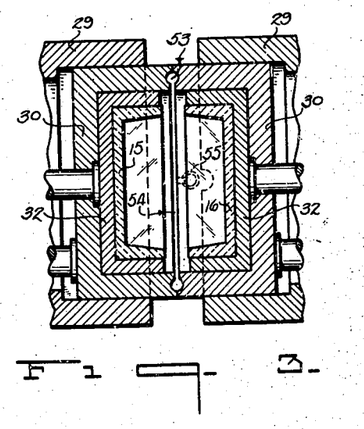

Upon reference particularly to Figs. 2 and 3, it will be noted that the outer mold sections 30 of machines 21 and 22 are provided around the edges thereof with grooves 51 and 52 respectively and that when the mold sections are brought together, these grooves form a continuous channel 53 which communicates with the interior of the mold as at 54. Communicating with the channel 53 is a connection 55 leading to a suitable suction creating apparatus to be hereinafter described. When the outer opposed mold sections 30 are moved together as shown in Fig. 3, they form in effect a closed housing and upon operation of the suction creating apparatus, the air will be exhausted from the housing to create a vacuum within the space between the two sections 15 and 16 of the block.

Figure 4:
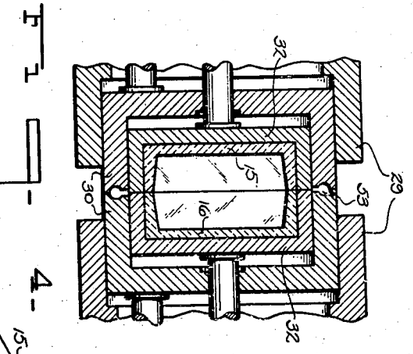

While this vacuum is maintained, the pistons 35 are actuated to move the inner mold sections 32 toward one another to bring the edge portions of the two sections or halves 15 and 16 of the block into engagement with one another as illustrated in Fig. 4. The two halves of the block are brought into contact while still sufficiently hot and plastic to adhere to one another and sufficient pressure is exerted to cause them to form a weld which securely and permanently unites them together. In order to maintain the edge portions of the two halves of the block at a proper temperature for welding, heaters 56 and 57 may be employed to reheat the said edge portions after the sections of the block have been formed and during movement thereof to horizontal position.

Figure 5:
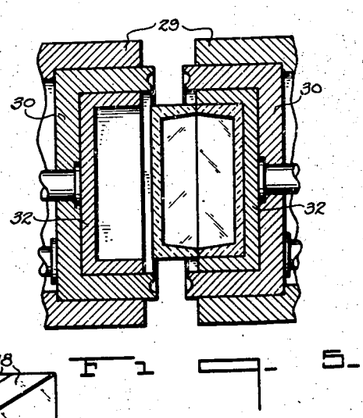

The joining of the two sections or halves of the block is effected while the said halves are in a controlled vacuum so that when the block is completed the air will be completely exhausted therefrom. This will result in a block having a maximum degree of insulating capacity. After the two halves of the block have been properly joined, the opposed inner mold sections 32 are first moved apart and then the outer mold sections 30, as shown in Fig. 5, at which time the completed block will be carried in one of the molds. Upon rotation of the carriages 25, the block will drop from the mold.

Although this invention is not limited to any particular type of mechanism for effecting the operation of the rotatable carriages 25 and the outer and inner mold sections 30 and 32 in the manner above described, yet one form of mechanism which may be employed for this purpose is illustrated in Figs. 1 and 7 to 10 of the drawings. The forward and backward movements of the outer and inner mold sections 30 and 32 of each machine 21 and 22, as well as the creation of the vacuum within the space between the two sections 15 and 16 of the glass block during the uniting thereof, are controlled by a timer designated in its entirety by the numeral 86 and pressure and exhausting apparatus associated therewith and designated generally by the numeral 87.

Figure 8:
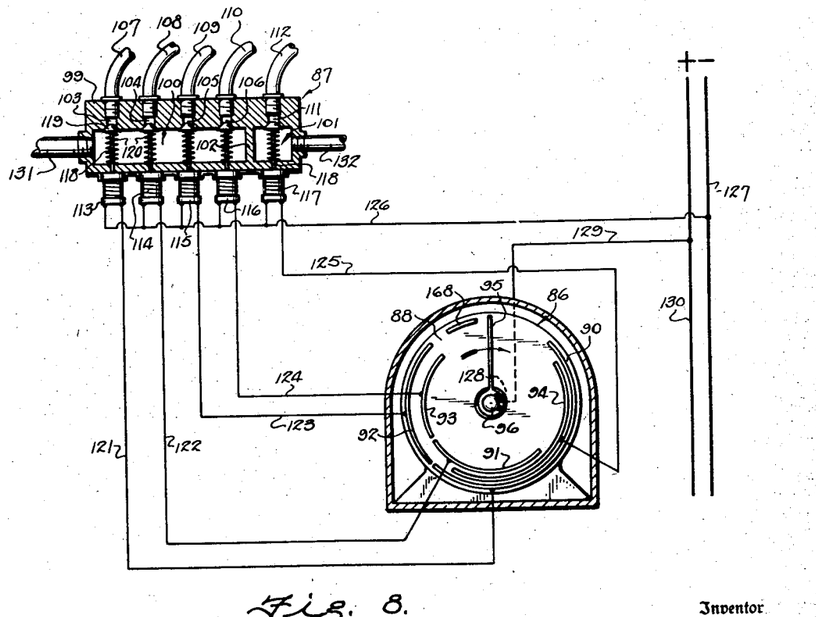
Fig. 8 is a view of the timer and the pressure and exhausting apparatus for controlling the movements of the mold sections and the creation of the vacuum between the glass block sections.

The timer 86 comprises a vertical stationary disc 88 mounted upon a fixed support 89 and carrying upon one face thereof a plurality of arcuately curved contact strips 90, 91, 92, 93 and 94. Associated with the disc 88 and adapted to engage said contact strips is a rotatable contact finger 95 mounted upon a horizontal shaft 96 driven from a motor 97 through the intermediary of suitable reduction gearing located in casing 98.

The pressure and exhausting apparatus 87 comprises a housing 99 provided therein with a relatively large chamber 100 and a relatively smaller chamber 101 separated from one another by a dividing wall 102. The top of the chamber 100 is provided with four openings 103, 104, 105 and 106 within which are secured one end of conduits 107, 108, 109 and 110 respectively communicating with said chamber. The top of chamber 101 is provided with a single opening 111 having associated therewith one end of a conduit 112 communicating with said chamber.

Carried by the bottom of the housing 99 are solenoids 113, 114, 115, 116 and 117, each having a vertically slidable plunger 118 passing upwardly through the bottom of said housing and provided at its upper end with a valve head 119 adapted to close the respective opening 103, 104, 105, 106 or 111. Each vertical plunger 118 is normally urged upwardly by a compression spring 120 to cause the valve head 119 to maintain the respective opening closed.

The solenoids 113, 114, 115, 116 and 117 are electrically connected with the contact strips 90, 91, 92, 93 and 94 on timer disc 88 by wires 121, 122, 123, 124 and 125 respectively, while each solenoid is also connected by a wire 126 with the negative main line 127. To complete a circuit through the solenoids, a contact plate 128 is associated with the timer shaft 96 and connected by a wire 129 to the positive main line 130.

Secured in one end of the housing 99 and communicating with the chamber 100 is a pipe 131 connected with a suitable pressure pump or the like (not shown) adapted to maintain a predetermined air pressure within said chamber at all times. Associated with the opposite end of housing 99 and communicating with the chamber 101 is a pipe 132 leading to an exhausting pump or the like (not shown) for maintaining a vacuum within said chamber at all times.

Figure 7:
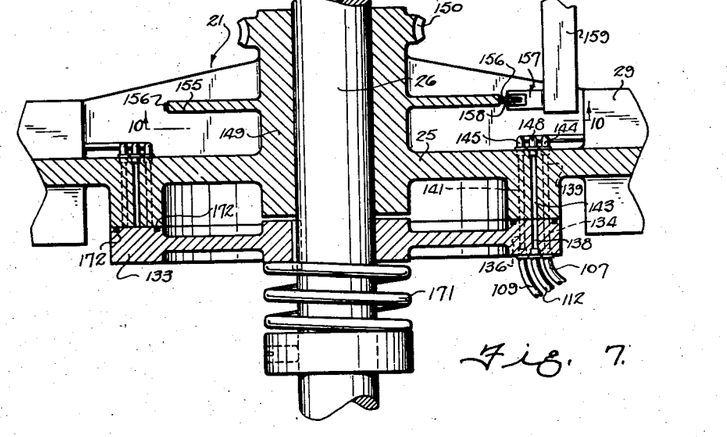
Fig. 7 is a sectional view through one of the rotatable carriages taken substantially on line 7—7 of Fig. 1.
Figure 10:
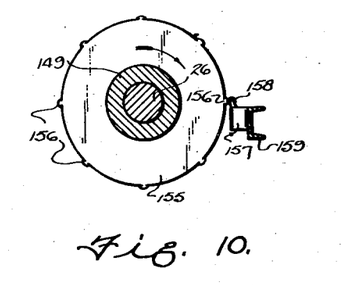
Fig. 10 is a detail section taken substantially on line 10—10 of Fig. 7.

Keyed to the stationary shaft 26 of each rotatable carriage 25 is a ring 133 provided with five openings 134, 135, 136, 137 and 138 extending through said ring and in the outer ends of which are secured the opposite ends of the conduits 107, 108, 109, 110 and 112 respectively. These openings are located opposite the point or station where the mold carriers are brought opposite one another as are the carriers 29 in Fig. 1. Each rotatable carriage 25 is also provided with a set of five openings 139, 140, 141, 142 and 143 for each of the molds carried thereby, said openings corresponding to the openings 134 to 138 respectively in the ring 133 and adapted to register therewith upon rotation of the carriages to bring the molds into position opposite one another. The two openings 139 and 141 of each set are connected by pipes 144 and 145 to the cylinder 34 of the outer mold section 30 of the respective molds, the two openings 140 and 142 being connected by pipes 146 and 147 to the cylinder 36 of the inner mold section 32, and the opening 143 being connected by a pipe 148 to the exhaust connection 55 of the mold.

As the two carriages 25 are rotated in opposite directions, as indicated by the arrows in Fig. 1, and two complemental molds carried thereby brought into position opposite one another, the openings 139 to 143 in each carriage are caused to register with the openings 134 to 138 respectively in the respective stationary ring 133. When the molds are brought into such position, the rotation of the carriages is stopped and a circuit completed through the motor 97 to rotate contact finger 95 in a clockwise direction. As the contact finger successively engages contact strips 90 to 94 on timer plate 88, the opposed outer mold sections 30 will first be moved forwardly to closed position as shown in Fig. 3; the air will then be exhausted from within the space between the glass block sections 15 and 16, after which the inner mold sections 32 will be moved together to effect the uniting of the glass block sections 15 and 16 as indicated in Fig. 4. The vacuum within the mold is then broken and first the outer mold sections 30 and then the inner mold sections 32 moved away from one another to the position shown in Fig. 5.

The rotatable carriages 25 are adapted to be driven in unison with one another and to this end the hub 149 of each of said carriages is provided with a worm gear 150 and extending between the two carriages is a common drive shaft 151 provided with worms 152 and 153 meshing with said worm gears 150. The shaft 151 is driven from a motor 154 and, upon operation thereof, the two carriages will be rotated in timed relation.

In the operation of the apparatus, and when the motor 154 is placed in operation, the two carriages 25 will be caused to rotate in timed relation in opposite directions until two molds are brought into position opposite one another as shown in Fig. 1, at which time the carriages are automatically brought to a stop. To accomplish this, there is carried by the hub 149 of each carriage 25 a disc 155 having a plurality of equally spaced knobs 156 around the periphery thereof. Associated with each carriage is a switch 157 having a spring-pressed contact arm 158 disposed in the path of travel of the knobs 156 on disc 155. The switch 157 is mounted in a fixed position upon a stationary support 159.

Figure 9:
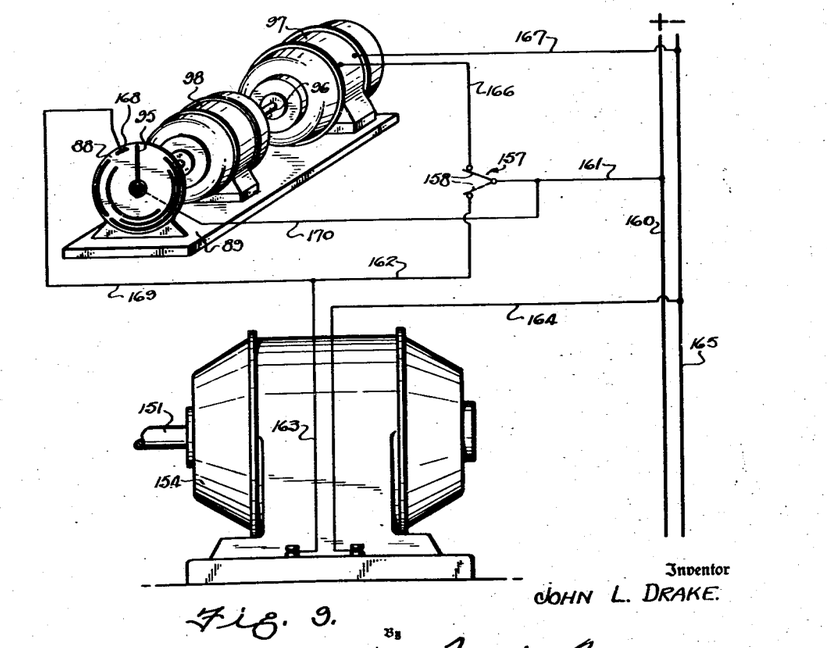
Fig. 9 shows an electrical wiring diagram for controlling the operation of the motor which drives the rotatable carriages.

When the molds on the two carriages 25 are brought directly opposite one another, one of the knobs 156 on disc 155 will engage the contact arm 158 of switch 157 and force it inwardly to assume the full line position indicated diagrammatically in Fig. 9, thereby breaking the circuit through the motor 154 and bringing the same to a stop. During the time the knob 156 is in engagement with the spring arm 158 and the motor 154 stopped, the motor 97 is placed in operation to cause rotation of the contact finger 95 and operation of the solenoids 113 to 117 to actuate the mold sections 30 and 32 whereby to effect the uniting of the glass block sections 15 and 16. On the other hand, when the switch arm 158 is not engaged by one of the knobs 156, it is urged forwardly to assume the position diagrammatically shown in broken lines in Fig. 9, at which time a circuit will be completed through the motor 154 to place the same in operation, whereupon current from the positive main line 160 will enter through wire 161 and pass through switch 157, wires 162 and 163 to motor 154 and thence out through wire 164 to the negative main line 165. However, as pointed out above, when the switch arm 158 is engaged by one of the knobs 156, the said switch arm is moved to full line position in Fig. 9 and the circuit through the motor 154 will be broken, thereby bringing the carriages to a stop, with the two molds directly opposite one another.

When the circuit through the motor 154 is broken and the rotatable carriages stopped, a circuit will be automatically completed through the motor 97 to start rotation of the contact finger 95. At this time, the current enters from the positive main line 160 and passes through wire 161, switch 157, and wire 166 to the motor 97, and thence out to the negative main line 165 through wire 167. When the motor 97 is placed in operation, the shaft 96 will be rotated and the contact finger 95 will initially engage the contact strip 90, thereby completing a circuit through the solenoid 113 to draw the plunger 118 thereof downwardly and permit compressed air to pass from the chamber 100 through the pipes 107 and 144 to the cylinder 34 to move the outer mold section 30 forwardly.

Upon continued movement, the contact finger will next engage contact strip 94 to complete a circuit through solenoid 117 and cause downward movement of the plunger 118 thereof, whereupon the exhausting mechanism acting through chamber 101 and pipes 112 and 148 will create a vacuum within the space between the glass block sections 15 and 16. The contact finger 95 will then engage contact strip 91, causing the energizing of solenoid 114 to permit the passage of compressed air through pipes 108 and 146 to cylinder 36 to move the inner mold section 30 forwardly to bring the glass block sections into engagement with one another and to effect the joining of them together while the vacuum is maintained. When the contact finger passes beyond contact strip 94, the solenoid 117 will be de-energized and the opening 111 closed to break the vacuum within the mold. Upon continued movement, the contact finger 95 will pass from contact strip 90 to contact strip 92 and cause energization of solenoid 115, whereupon compressed air will be passed through the pipes 109 and 145 to cylinder 34 to cause rearward movement of the outer mold section 30. The contact finger then passing from contact strip 91 to contact strip 93 will cause energization of solenoid 116 to permit compressed air to pass through pipes 110 and 147 to cylinder 36 to move the inner mold section 32 rearwardly.

When this last operation is completed, namely, the movement of the inner mold section 32 rearwardly to the position shown in Fig. 5, the carriages 25 are again ready to be rotated to bring the next pair of molds opposite one another. To again start up the motor 154 while one of the knobs 156 on disc 155 is in engagement with switch arm 158, there is carried by the timer disc 88 a relatively short contact strip 168 from which runs a wire 169 connected to wire 163. Another wire 170 runs from contact finger 95 to wire 161. Thus, when the contact finger 95 engages contact strip 168, a circuit will be completed through the motor 154 to place it in operation and thus effect rotation of the carriages 25. At this time, the current will travel from the positive main line 160 through wires 161 and 170, contact finger 95, contact strip 168 and wires 169 and 163 to the motor 154, and thence to negative main line 165 through wire 164.

When the carriage has been rotated sufficiently to move the knob 156 on disc 155 out of engagement with switch arm 158, the switch arm will be urged outwardly to again assume the broken line position in Fig. 9, whereupon operation of the motor 97 will be stopped, while the motor 154 will continue to operate until the next knob 156 engages switch arm 158. When the knob 156 is moved out of engagement with switch arm 158, the contact finger 95 will also pass beyond contact strip 168 as shown in Fig. 9 and will be held stationary until the next knob 156 forces switch arm rearwardly to break the circuit through motor 154 and complete the circuit through motor 97. The ring 133 may be urged toward and held in engagement with its respective carriage 25 by a compression spring 171 encircling shaft 26, and suitable sealing means 172 may be provided between the ring and carriage to provide a tight joint.

Figure 11:
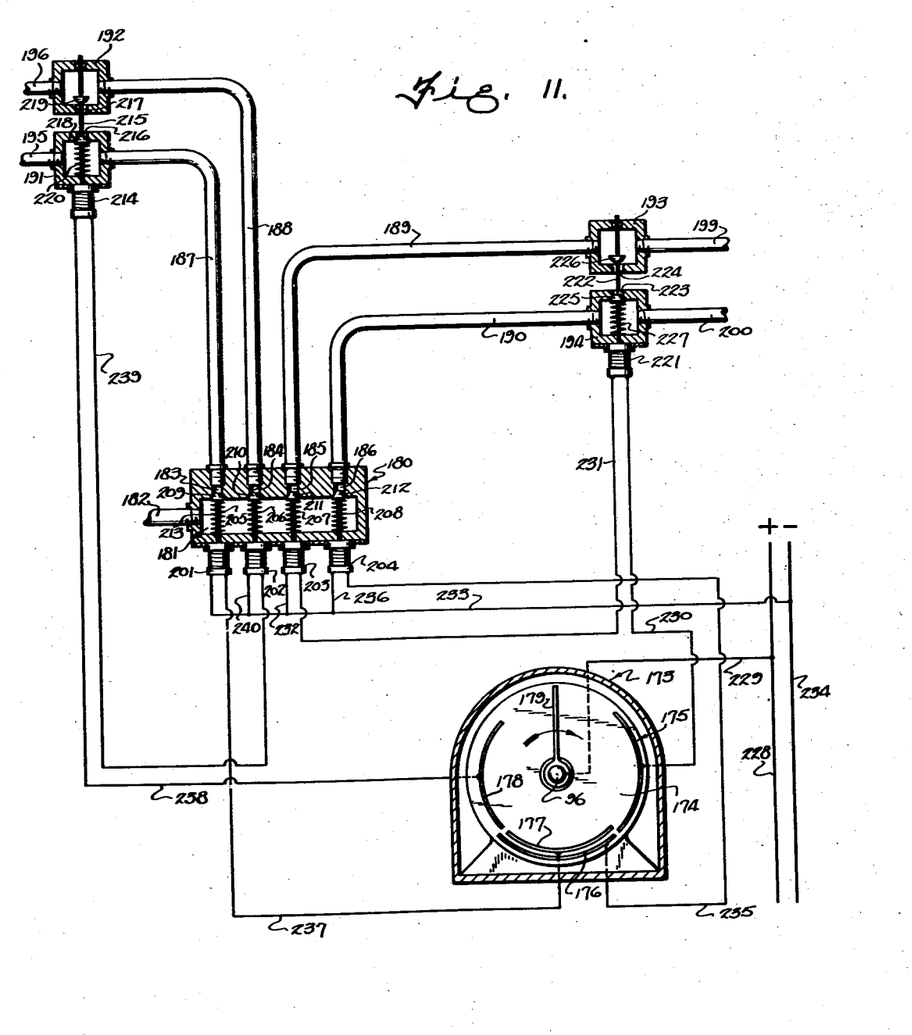
Fig. 11 is a view of the timer and associated means for controlling the operation of the glass feeding means and glass pressing means.

In Fig. 11 is illustrated a timer and means associated therewith for controlling the operation of the glass feeder plungers 47 of furnaces 23 and 24 to effect the periodic feeding of charges of molten glass 49 into the molds and for also controlling the operation of the press plungers 37 and 38 in timed relation to each other and also in timed relation to the rotation of the mold carriages 25 and actuation of the molds.

The timer is designated in its entirety by the numeral 173 and comprises a stationary disc 174 which is also preferably mounted in surrounding relation to the shaft 96. Carried by the disc 174 are the four arcuate contact strips 175, 176, 177 and 178, while fixed to the shaft 96 is a contact finger 179 adapted to selectively engage the contact strips 175—178 upon rotation of said shaft in the direction indicated by the arrow.

Associated with the timer 173 is a housing 180 having a chamber 181 therein and communicating with one end of said chamber is a pipe 182 connected to a suitable pressure pump or the like (not shown) adapted to maintain a predetermined air pressure within chamber 181 at all times. Provided in the top of housing 180 are four openings 183, 184, 185 and 186 in the upper ends of which are fitted pipes 187, 188, 189 and 190 respectively. Associated with the opposite ends of pipes 187 and 188 are the valve casings 191 and 192, while similar valve casings 193 and 194 are associated with the opposite ends of pipes 189 and 190. Leading from the valve casings 191 and 192 are pipes 195 and 196 connected to a vertical cylinder 197 (Fig. 1) in which operates a piston 198 carrying the plunger 47 of the respective furnace 23 or 24, while leading from the valve casings 193 and 194 are pipes 199 and 200 connected with the respective cylinder 41 or 42 of the press plungers 37 and 38.

Carried by the bottom of the housing 180 are solenoids 201, 202, 203 and 204 having vertical plungers 205, 206, 207 and 208 which pass upwardly through chamber 181 and are provided with valves 209, 210, 211 and 212 which control the respective openings 183, 184, 185 and 186. The valves 209—212 are normally urged upwardly into closed position, when the solenoids 201—204 are deenergized, by a coil spring 213 encircling each of the solenoid plungers 205—208. The solenoid 201 is electrically connected with the contact strip 177 of timer 173; solenoid 202 with contact strip 178 through wire 239, solenoid 214 and wire 238; solenoid 203 with contact strip 175 through wire 231, solenoid 221 and wire 230; and solenoid 204 with contact strip 176.

Carried by the valve casing 191 is a solenoid 214, the plunger 215 of which passes upwardly through an opening 216 in the top of said valve casing 191 and also through an opening 217 in the bottom of valve casing 192. Secured to the plunger 215 are the two valves 218 and 219 adapted to control the openings 216 and 217 respectively. The plunger 215 is normally urged upwardly, upon de-energization of solenoid 214, by a coil spring 220 to maintain the valve 218 closed and valve 219 open. However, upon energization of the solenoid 214, the plunger 215 thereof will be drawn downwardly against the action of spring 220 to open valve 218 and close valve 219.

Carried by the valve casing 194 is a solenoid 221, the plunger 222 of which extends upwardly through an opening 223 in said valve casing 194 and also through an opening 224 in valve casing 193. Fixed to the plunger 222 are valves 225 and 226 for controlling the openings 223 and 224 respectively, said plunger being normally urged upwardly by a coil spring 227, upon de-energization of solenoid 221, to maintain the valve 225 closed and valve 226 open. Upon energization of the solenoid 221, the plunger 222 thereof will be drawn downwardly against the action of spring 227 to open valve 225 and close valve 226.

In the operation of the timer 173 and associated parts above described, when the rotatable carriages 25 are brought to a stop, with two molds disposed opposite one another and during movement of the molds toward one another to effect the joining of the two halves of the block, the timer 173 will simultaneously operate to cause charges of molten glass 49 to be delivered from the furnaces 23 and 24 to the molds positioned beneath the outlets 46 and to also actuate the press plungers 37 and 38 to press the charges of glass in the molds positioned opposite said plungers. Although the arrangement illustrated in Fig. 11 is adapted to actuate only one glass feeder plunger and one press plunger, it will be readily understood that the apparatus can simply be duplicated to cause simultaneous operation of both glass feeder plungers 47 and press plungers 37 and 38.

More particularly, when the mold carriages 25 are brought to a stop and the shaft 96 placed in rotation to operate timer 86, the timer 173 will also be actuated. As the shaft 96 rotates, and contact finger 179 engages contact strip 175, a circuit will be completed through solenoid 221 to draw the plunger 222 thereof downwardly and thereby open valve 225 and close valve 226. Substantially simultaneously, the solenoid 203 will be energized to open valve 211, whereupon compressed air will be forced through pipe 189, valve casing 193 and pipe 199 into cylinder 41 to urge the respective plunger 37 or 38 outwardly to shape the charge of molten glass in the respective mold. At this time, the current will pass from the positive main line 228 through wire 229, contact finger 179, contact strip 175, wire 230, solenoid 221, wire 231, solenoid 203, and wires 232 and 233 to the negative main line 234. Upon forward movement of the press plunger, air discharged from the cylinder through pipe 200 will pass into the valve casing 194 and thence to the atmosphere through valve 225.

When the contact finger 179 passes from contact strip 175, the solenoids 221 and 203 will be de-energized, whereupon the valve 211 will be closed to shut off the supply of air to the cylinder 41 or 42 and, likewise, the valve 225 will be closed and valve 226 opened. Upon leaving contact strip 175, the contact finger 179 engages contact strip 176, whereby to complete a circuit through solenoid 204 to effect the return of the press plunger to inoperative position. At this time, current entering from the positive main line 228 will pass through the contact finger 179, contact strip 176, wire 235, solenoid 204, and wires 236 and 233 to the negative main line 234. Upon energization of solenoid 204, valve 212 will be opened and air forced through pipe 190, valve casing 194, and pipe 200 to the cylinder 41 or 42 to force the plunger 37 or 38 inwardly. Air discharged through the pipe 199 will pass into the valve casing 193 and be permitted to flow therefrom through opening 224. When the contact finger 179 passes beyond contact strip 176, the solenoid 204 will be deenergized to close valve 212.

During the time that the contact finger 179 engages contact strip 176, it is also in engagement with contact strip 177 to complete a circuit through the solenoid 201, whereupon current entering from the positive main line 228 will pass through contact finger 179, contact strip 177, wire 237, solenoid 201, and wire 233 to the negative main line 234. Upon energization of solenoid 201, the valve 209 will be opened and air forced through pipe 187, valve casing 191 and pipe 195 to the cylinder 197 of furnace 23 or 24, causing the plunger 47 thereof to be raised and permitting a charge of molten glass 49 to pass through the outlet 46 into the mold positioned therebeneath. Air being forced from the cylinder 197 through pipe 196 will pass into valve casing 192 and flow therefrom to the atmosphere through opening 217.

When the contact finger 179 passes beyond contact strip 177, the solenoid 201 will be de-energized to cause closing of the valve 209. The contact finger then engages contact strip 178 causing the energization of solenoid 202 and also energization of solenoid 214. At this time the current will pass from the positive main line through contact finger 179, contact strip 178, wire 238, solenoid 214, wire 239, solenoid 202, and wires 240 and 233 to the negative main line 234. When this is done, the plunger 215 of solenoid 214 will be drawn downwardly to open valve 218 and close valve 219. Simultaneously, valve 210 will be opened to permit air to be forced through pipe 188, valve casing 192 and pipe 196 to cylinder 197 to force the plunger 47 downwardly to close outlet 46. Upon downward movement of plunger 47, air forced from the cylinder 197 through pipe 195 will pass into valve casing 191 and thence to the atmosphere through opening 216.

The operation of the glass feeder plungers 47 and press plungers 37 and 38 is so controlled that their actuation will be completed by the time the contact finger 95 of timer 86 engages contact plate 168 to again start the motor 154 to rotate the carriages 25. Thus, it will be seen that during the actuation of the molds, which are disposed in horizontal position to effect the joining of the two halves of the block, charges of molten glass will be deposited in those molds positioned beneath the furnace outlets 46 and simultaneously the press plungers 37 and 38 will be actuated to press the charges of molten glass in the molds opposite said press plungers to form the two halves of a block. Due to the provision of the timers 86 and 173, these various operations will be so controlled that they will be performed in properly timed relation to one another.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of multipart hollow glass building blocks, a pair of molds adapted to receive separate charges of molten glass, each mold including a relatively deep outer section and a shallower inner section movable relative to one another, means normally spaced from said molds and adapted to cooperate with the inner mold sections for shaping the charges of molten glass to form two substantially similar halves of a block, means for moving said molds and preformed halves of the block into position opposite one another and means for moving the outer sections of the molds into engagement with one another to form a closed housing within which the inner sections and the preformed halves of the block are still spaced from one another, means for exhausting the air from the closed housing so formed to create a vacuum between the two spaced halves of the block, and means for then moving the inner mold sections relative to the outer mold sections to bring the two halves of the block into engagement with one another and to effect the uniting thereof, when said molds and preformed halves of the blocks are in opposed relation to one another.

2. In apparatus for the manufacture of multipart hollow glass building blocks, a pair of carriages arranged side by side and rotatable in opposite directions about horizontal axes, molds movably carried by said carriages and adapted to receive separate charges of molten glass, each mold including relatively movable outer and inner sections, means normally positioned out of the path of travel of said carriages and cooperating with the inner mold sections for shaping the charges of molten glass to form two substantially similar halves of a block, means for intermittently rotating said carriages to bring the molds and preformed halves of the block into position opposite one another and means for moving the outer sections of the molds into engagement with one another to form a substantially closed housing, means for exhausting the air from the closed housing so formed to create a vacuum between the two halves of the block, and means for then moving the inner mold sections relative to the outer mold sections to bring the edge portions of the two halves of the block into engagement with one another and to effect the welding of them together while maintaining said vacuum, when said molds and preformed halves of the blocks are in opposed relation to one another.

3. In apparatus for the manufacture of multipart hollow glass building blocks, a pair of molds adapted to receive separate charges of molten glass, each mold including a relatively deep movable outer section and a shallower inner section movable only as a unit relative to and independently of the outer section, means normally spaced from said molds but adapted to cooperate with the inner mold sections for shaping the charges of molten glass to form two substantially similar halves of a block, means for moving said molds and preformed halves of the block into position opposite one another and means for moving the inner and outer sections of the molds simultaneously to bring the relatively deep outer sections of the molds into engagement with one another to form a closed housing within which the inner sections and the preformed halves of the blocks are still spaced from one another, means for exhausting the air from the closed housing so formed to create a vacuum between the two spaced halves of the block, and means for moving the inner mold sections relative to the outer mold sections to bring the two halves of the block into engagement with one another and to effect the uniting thereof, when said molds and preformed halves of the blocks are in opposed relation to one another.

4. In apparatus for the manufacture of multi-part hollow glass building blocks, a pair of carriages arranged side by side and rotatable in opposite directions about horizontal axes, molds movably carried by said carriages and adapted to receive separate charges of molten glass, each mold including relatively movable outer and inner sections, means normally positioned out of the path of travel of said carriages and cooperating with the inner mold sections for shaping the charges of molten glass to form two substantially similar halves of a block, means for intermittently rotating said carriages to bring the molds and preformed halves of the block into position opposite one another; and means for moving the outer sections of the molds into engagement with one another to form a substantially closed housing, means for exhausting the air from the closed housing so formed to create a vacuum between the two halves of the block, means for then moving the inner mold sections relative to the outer mold sections to bring the edge portions of the two halves of the block into engagement with one another and to effect the welding of them together while maintaining said vacuum, when said molds and preformed halves of the blocks are in opposed relation to one another, and timing mechanism operatively associated with said apparatus for controlling the operations of the several elements in synchronism.

JOHN L. DRAKE.

REFERENCES CITED

The following references are of record in the file of this patent:

UNITED STATES PATENTS

| Number | Name | Date |
| --- | --- | --- |
| 2,006,818 | Zimber | July 2, 1935 |
| 2,097,073 | Long | Oct. 26, 1937 |
| 2,110,900 | Zimmerman et al. | Mar. 15, 1938 |
| 2,149,246 | Zimmerman et al. | Feb. 28, 1939 |
| 2,169,404 | Buttner | Aug. 15, 1939 |
| 2,191,953 | Blau | Feb. 27, 1940 |
| 2,215,027 | Blau | Sept. 17, 1940 |
| 2,235,680 | Haven et al. | Mar. 18, 1941 |
| 2,238,153 | Blau | Apr. 15, 1941 |
| 2,290,088 | Bleakley | July 14, 1942 |
| 2,313,160 | Mayers | Mar. 9, 1943 |